United States Patent
Peterson et al.

(10) Patent No.: US 8,407,557 B2
(45) Date of Patent: Mar. 26, 2013

(54) SYSTEM, METHOD AND COMPUTER READABLE MEDIUM FOR COMMUNICATION OF ENCODED MESSAGES

(75) Inventors: Robert W Peterson, Plano, TX (US); Thomas Wheeler, Frisco, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 576 days.

(21) Appl. No.: 12/629,939

(22) Filed: Dec. 3, 2009

(65) Prior Publication Data

US 2011/0138243 A1    Jun. 9, 2011

(51) Int. Cl.
*G06F 11/00* (2006.01)
(52) U.S. Cl. ........................................................ 714/755
(58) Field of Classification Search .................... 714/755
See application file for complete search history.

(56) References Cited

U.S. PATENT DOCUMENTS

| | | | |
|---|---|---|---|
| 6,996,762 B2 * | 2/2006 | Kuo et al. | 714/749 |
| 7,679,514 B2 * | 3/2010 | Rofougaran et al. | 340/572.2 |
| 7,969,333 B2 * | 6/2011 | Normile et al. | 341/51 |
| 2005/0021634 A1 * | 1/2005 | Naim et al. | 709/206 |
| 2007/0274400 A1 * | 11/2007 | Murai et al. | 375/240.26 |
| 2008/0063086 A1 * | 3/2008 | Isu et al. | 375/240.25 |

* cited by examiner

*Primary Examiner* — Scott Baderman
*Assistant Examiner* — Elmira Mehrmanesh
(74) *Attorney, Agent, or Firm* — Stolowitz Ford Cowger LLP

(57) ABSTRACT

A message encoding specification and implementation where a receiver of an encoded message determines if the message can be decoded. If the receiver can decode the message, it does so and continues processing the message. If the receiver cannot decode the message, it returns a distinguished failure message to the sender, expecting the sender to resend the message using a different encoding scheme. When a sender receives the distinguished failure message that the receiver cannot decode the message, the sender encodes the message using an alternate encoding scheme, if one is available, and resends the message. The process continues until the sender has tried all available encoding schemes. If a sender exhausts the collection of available encoding schemes without finding one the receiver can successfully decode, the sender treats the failure as an error.

16 Claims, 4 Drawing Sheets

SYSTEM, METHOD AND COMPUTER READABLE MEDIUM FOR COMMUNICATION OF ENCODED MESSAGES

FIELD OF THE INVENTION

This disclosure relates to communications protocols for communicating between a plurality of computers and in particular to the communication of encoded messages.

BACKGROUND OF THE INVENTION

Given two computers exchanging messages over a communications link where the messages contain encoded message elements, the two computers must agree on the encoding specification, and both must implement encoding and decoding procedures that produce an encoded message from message elements, and that produce decoded message elements equivalent to the originals from the encoded message. The problem arises when at least one of the computers has available implementations of at least one encoding specification not available on the other computer. To successfully communicate, the two computers must agree to use an encoding specification common to both.

When one computer sends a message to the other without knowing which encoding specification is common to both computers, the receiving computer will not understand the message if it is encoded using a specification the receiving computer does not implement, and as a result the communication attempt fails.

Current solutions involve marking the communications attempt as a failure when the receiving computer cannot decode the message from the sending computer. The receiving computer can simply ignore the undecipherable message, in which case the sending computer generally knows about the failure by detecting the absence of a response. The receiving computer can attempt to respond to the sending computer with an error message, which could itself be encoded using a specification the sending computer does not implement. When the sending computer detects the failure, it typically notifies the sending application, but in some situations this is not possible, e.g. when the sending application uses a one-to-many (multicast) feature and doesn't know who the receivers might be.

Recovery from the error involves notifying the application of the failure, if possible, and depending on the application to recover. The application might respond to the failure by encoding the message using a different specification and resending the message, by ignoring the error notification, or by entirely abandoning the attempt to communicate. All these require the application be written to deal with the failure of the receiving computer, and such code is both complex and not particularly relevant to the purpose of the application. In addition, recovery attempts consume the sending computer's resources without producing equivalent value, i.e., recovery attempts are counterproductive overhead processing.

What is required is a system, method and computer readable medium for improved communication of encoded messages.

SUMMARY OF THE INVENTION

In one aspect of the disclosure, there is provided a method for communication of encoded messages between a sender and a receiver. In the method, a message is encoded in a first encoding scheme and transmitted from the sender to the receiver. The receiver determines if the message can be decoded in the receiver and if not, transmits a distinguished failure notification from the receiver to the sender. The sender processes the distinguished failure notification, encodes the message using an alternative encoding scheme and sends the message encoded using the alternative encoding scheme to the receiver.

In one aspect of the disclosure, there is provided a system comprising at least one sender computer comprising a message engine. The message engine is configured to encode an application message of an application executing on the sender computer using a first encoding scheme, transmit the application message to one or more receiver computers, receive a distinguished failure notification from at least one of the one or more receiver computers, encode the application message using an alternative encoding scheme, and transmit the application message encoded using the alternative encoding scheme to the at least one receiver computer.

In one aspect of the disclosure, there is provided a computer-readable medium comprising computer-executable instructions for execution by a processor, that, when executed, cause the processor to receive an application message from an application, encode the application message using a first encoding scheme, transmit the application message to a receiver processor, receive a distinguished error notification from the receiver processor, encode the application message using an encoding scheme indicated in the distinguished error notification, and retransmit the application message to the receiver processor.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
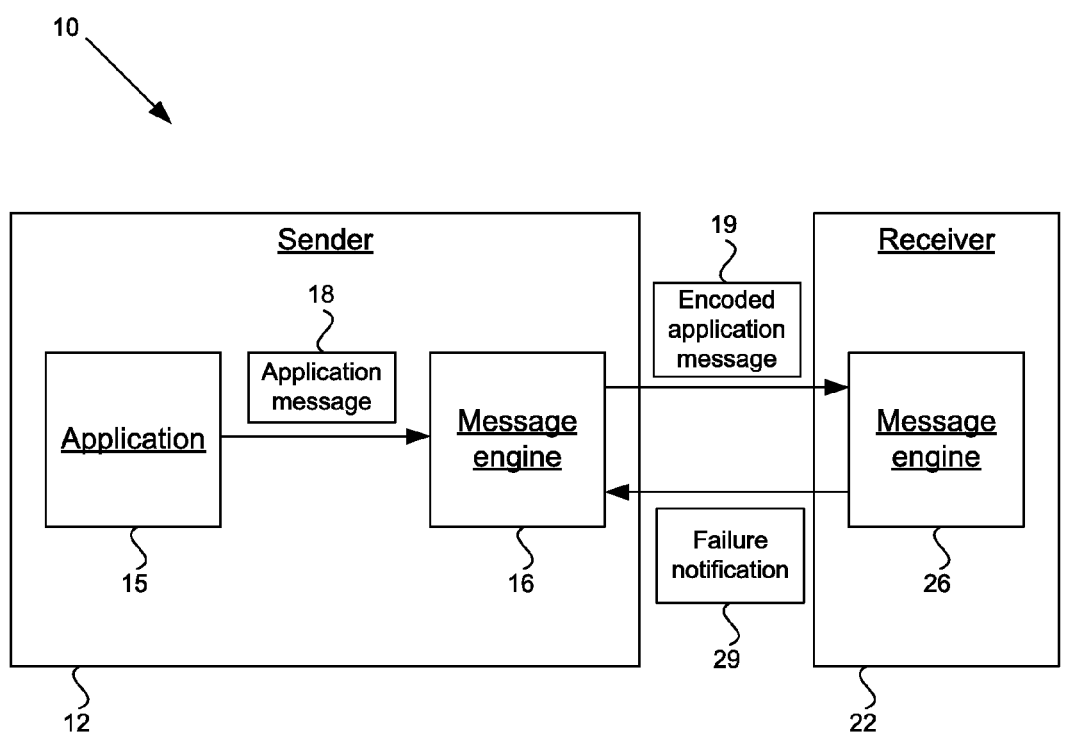
FIG. 1 illustrates a system of computers implementing an embodiment of a communications method.

In FIG. 1, there is shown a system 10 in accordance with an embodiment of the present disclosure. The system 10 may include a plurality of computers of which a sender computer 12 and a receiver computer 22 are illustrated. In the present example, the sender computer 12 is executing an application 15 that requires a message to be sent from the sender computer 12 to at least one receiver computer 22 within the system. The application 15 invokes a message engine 16 by passing an application message 18 to the message engine 16. The message engine 16 receives the application message and encodes the application message using an encoding scheme implemented on the computer 12. The message engine 16 transmits an encoded application message 19 to a corresponding message engine 26 of the receiver computer 22. In accordance with an embodiment of the present disclosure, the message engine 16 and the message engine 26 communicate using an implemented communications protocol that includes a specification for encoding messages.

First, the two computers 12, 22 agree on a specification describing how to wrap or envelope the encoded message 19 so that a receiving computer can understand which encoding specification the sender used to produce the encoded message. For example, the specification may define a default header protocol that each computer on the system can process. Such protocols may be standard, known protocols, or may be proprietary protocols. In one embodiment, a default header protocol includes an indication of the encoding system used by the sender computer for encoding the contents of the message. Thus, when the header is received by a receiver computer, the receiver is able to determine from the header whether the receiver will be able de-encode the message.

The specification also describes how a receiving computer notifies the sending computer that the receiving computer cannot decode the message using a failure notification message 29. The specification may describe how the failure notification can contain a list of one or more encoding specifications the receiving computer can understand.

An example specification for a message header readily decoded by various computer systems consists of at least the following fields, each one encoded as indicated. The encoded body (or payload) of the message will immediately follow the header fields. This header may be used for both a request message and a response message.

Protocol name: four bytes identifying the protocol used to encode the message, e.g., RSMP. The characters are encoded in US-ASCII, also known as ISO-8859-1.

Protocol version: one byte containing the version of the protocol, encoded as an 8 bit binary fixed point number.

Message type: one byte containing the type of the message, encoded as an 8 bit binary fixed point number. Type 0 is an invocation request that expects a result. Type 1 is an invocation request that does not expect a result, i.e., the invocation never returns anything. Type 2 is an invocation result when the invocation succeeds. Type 3 is an invocation result when the invocation fails. Type 4 is the result returned when the receiver cannot decode the message payload.

Payload length: a two byte (16 bit) binary fixed point number in big-endian network byte order. In some cases the payload is empty, e.g., a type 4 response when the message receiver suggests no alternative encoding scheme.

Given the above described specification, when the receiving computer receives a message encoded using a specification the receiving computer cannot handle, the receiving computer sends a failure notification to the sending computer describing not only the failure, but a list of encoding specifications the receiving computer implements.

A method for communication of encoded messages will now be described with reference to FIG. 1 and to the flowchart 100 of FIG. 2. At step 101, a sender computer 12 encodes a message using a first encoded scheme and transmits the encoded message 19 to a receiver 22 (step 102) using the above described protocol. The receiver computer 22 processes the received message to determine if the message can be decoded in the receiver (step 103). The message is decoded if possible (step 108) but if the message cannot be decoded, the receiver computer responds with a distinguished failure notification 29 (step 104). The sender computer 12 processes the distinguished failure notification 29 (step 105) and encodes the application message using a further encoding scheme 106. The process then returns to step 102 as the re-encoded message is sent to the receiver computer 22.

When the sending computer 12 receives a failure notification message 29, the sending computer selects a different message encoding specification, giving a strong preference to any specifications enumerated in the failure notification message, encodes the message elements using an implementation of the selected specification, then resends the message. This cycle is repeated until either the receiving computer does not return a failure notification message, or the sending computer exhausts the available encoding specification implementations.

As described above, the communications protocol may be implemented by message engines 16, 26 within the sender and receiver computers. Importantly, the retries do not involve the sending application 15, which reduces the application overhead, both in terms of error handling code the application contains, and in terms of the computer resources needed to handle the receiving computer's failure to decode a message.

Re-encoding and re-sending of the application message can be replicated across each receiving computer that responds with a distinguished failure notification.

In one example, the sender process may be represented by the following pseudo-code:

```
// The sender method
public Object synchronousMessage( Message message )
{
    boolean receiverDecodeFailure = true;
    Object result = null;
    for (encoder in availableEncodings && receiverDecodeFailure)
    {
        Buffer encodedMessage = encoder.encode(message);
        connection.sendMessage( encodedMessage );
        result = connection.readReply( );
        receiverDecodeFailure = result instanceof
DecodeFailureException;
    }
    return result;
}
```

The receiver process may be represented by the following pseudo-code:

```
// The receiver method
public void messageProcessor( Connection connection, Buffer
encodedMessage )
{
    Decoder decodeImpl = lookupDecoder( encodedMessage );
    if (null == decodeImpl)
    {
        connection.reply( new DecodeFailureException( ) );
        return;
    }
    try
    {
        Message message = decodeImpl.decode
        (encodedMessage); message.execute( );
    }
    catch ( DecodeFailureException dfe)
    {
        connection.reply( dfe );
    }
}
```

One implementation of the distinguished error message may contain a list of acceptable encodings (well known identifiers) that the client can decode. For example, a header of the distinguished error message may be encoded using a default encoding known to all computers on the system. The header may indicate one or more preferred encodings of the receiver.

Figure 3:
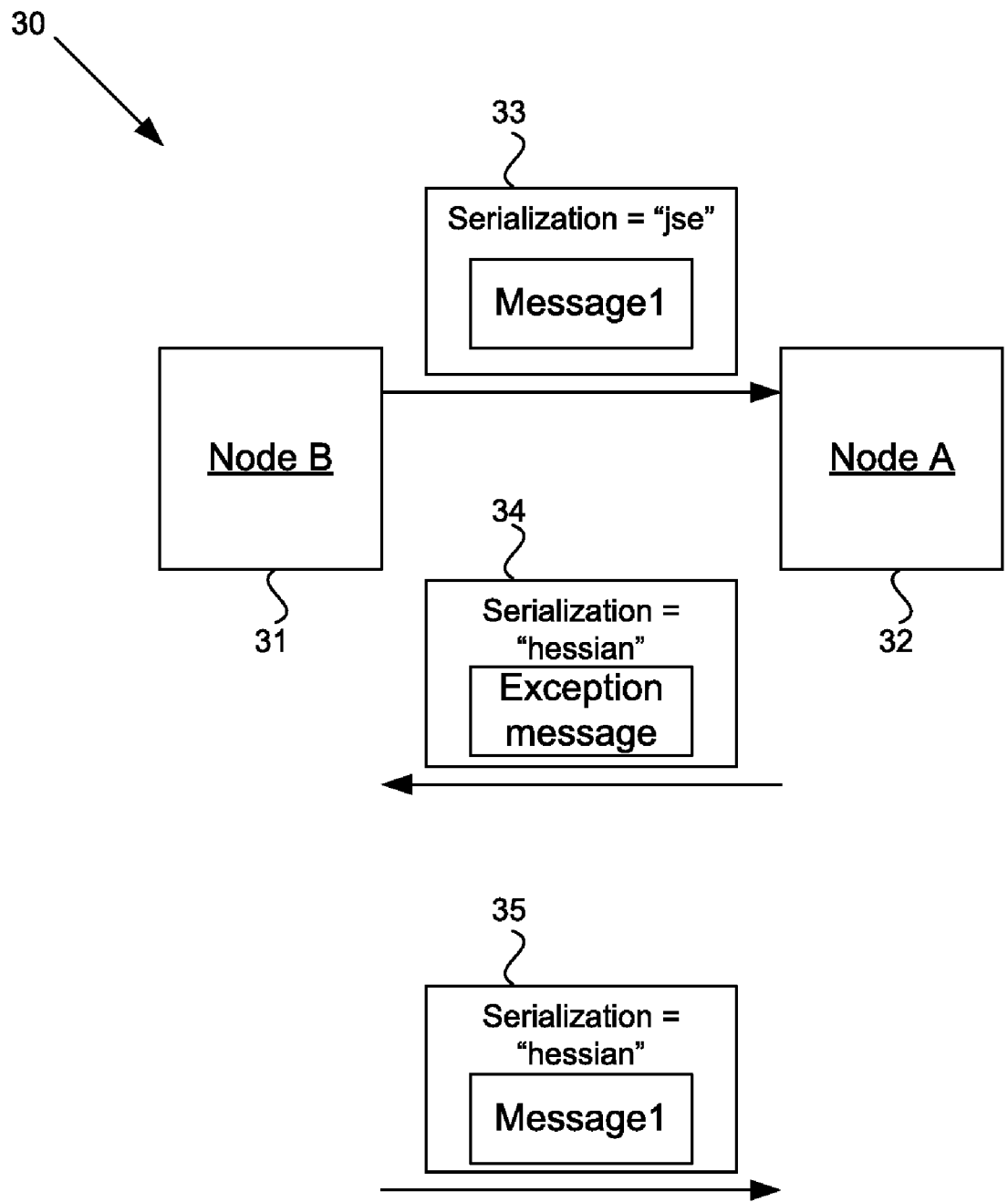
FIG. 3 illustrates an example of a communications method.

A specific example is illustrated in the system 30 of FIG. 3. In the system 30, Node B 31 provides a sender node that supports multiple serialization types including Java serialization. Node A 32 provides a receiver node that does not support Java serialization. When Node B 31 is required by an application running within Node B 31 to send a message to Node A 32, Node B 31 sends a first message 33 to Node A 32. The header of message 33 indicates that the message is encoded using Java serialization. At Node A 32, message 33 is received but cannot be decoded because the Node A 32 does not support Java serialization. However, Node A 32 is able to read the header and can therefore generate an error message. Thus, Node A 32 generates an exception message 34 to Node B 31. The exception message 34 indicates in the header that the preferred encoding for Node A 32 is a "hessian" serialization. When Node B 31 receives the exception message 34, Node B 31 deserializes the packet and processes the exception message, without reference to the Node B application. Processing of the exception message causes the Node B 31 to re-encode the message using a different encoding scheme and to re-send the message 35. In particular, Node B processes the exception message 34 to determine the preferred encoding of Node A 32. If the preferred encoding scheme is available to Node B, then Node B will re-encode the message using the preferred encoding scheme.

While the exception message 34 has been described herein as indicating a single preferred encoding scheme of the receiver node, it will be apparent to a person skilled in the art that the specification of the protocol may define that the distinguished error message may indicate multiple possible encoding schemes.

Figure 4:
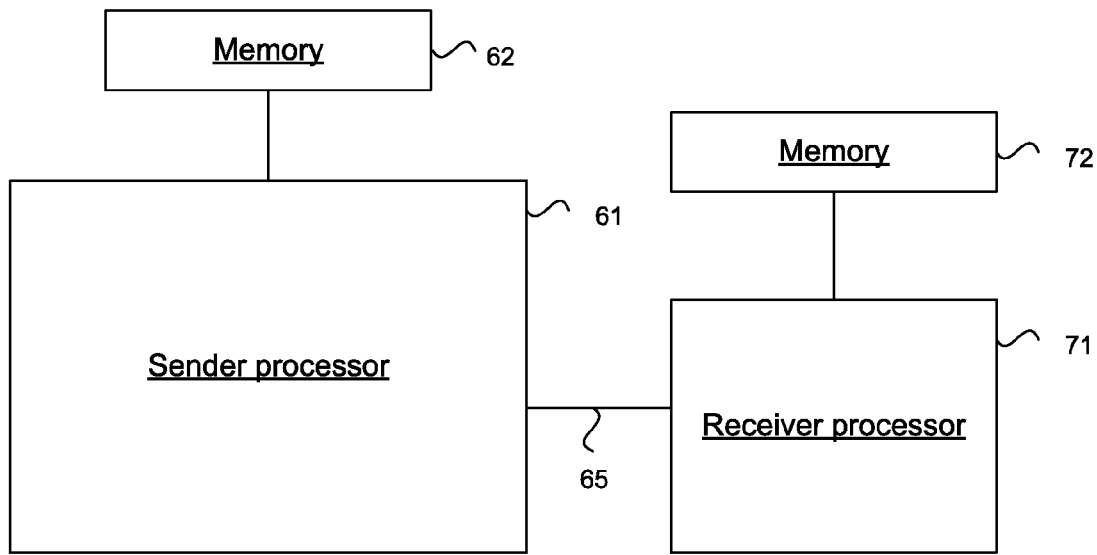
FIG. 4 illustrates a processor and memory of a sender computer and of a receiver computer.
Figure 5:
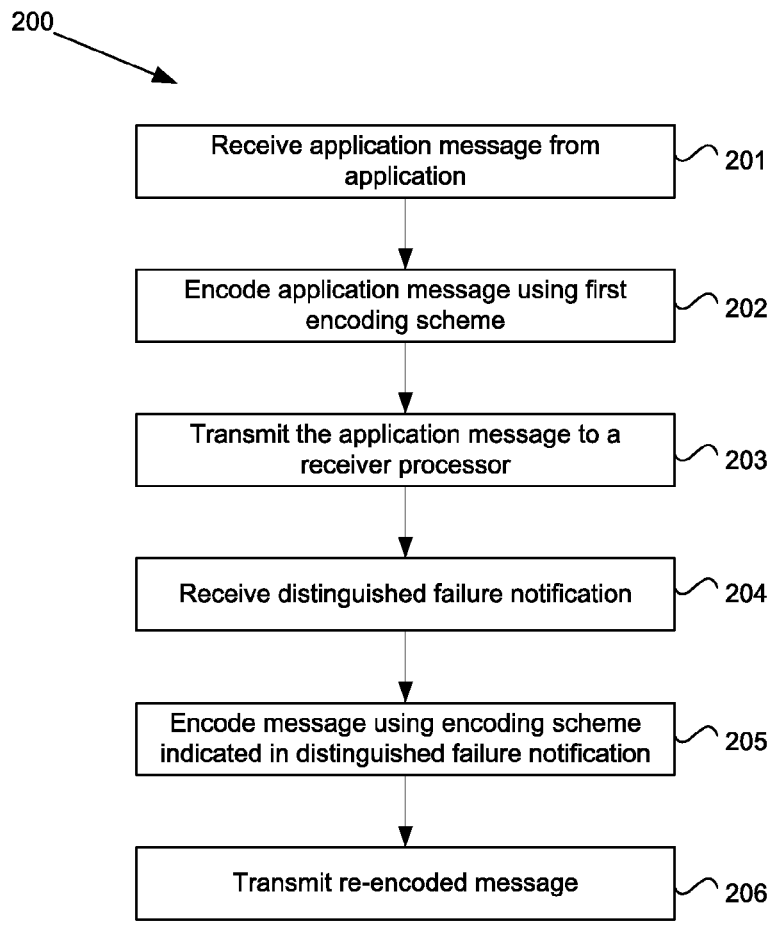
FIG. 5 illustrates an instruction set that can be executed on the sender processor of FIG. 4.

As is known, the sender computer 12 will typically include a processor 61 and an operatively associated memory 62, as shown in FIG. 4. Similarly, a receiver computer 22 will typically include a receiver processor 71 and an operatively associated memory 72. The sender processor 61 may communicate with the receiver processor 71 through a suitable communications link 65. In one embodiment of the present disclosure, the memory 62 may store instructions that are executable on the processor 61. An instruction set 200 that may be executed on the sender processor 61 is depicted in the flowchart of FIG. 5. Specifically, when executed, the instruction set 200 allows the processor 61 to receive an application message (step 201) from an application, which may also be executing on the processor 61 or may be executing an additional processors associated with the sender computer 12. The processor 61 then encodes the application message 202 using a first encoding scheme and transmits the application message to the receiver processor 71 (step 203). If the receiver processor 71 cannot decode the application message, the sender processor 61 receives a distinguished failure notification from the receiver processor (step 204) and then encodes the application message using an encoding scheme indicated in the distinguished failure notification 205 before retransmitting the application message to the receiver processor 71 (step 206). The receiver memory 72 may store codes for indicating the encoding schemes which may be implemented on the receiver computer.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
transmitting a message encoded using an initial encoding scheme to a receiver;
encoding the message, without reference to an application origination the message, using an alternative encoding scheme in response to receiving a failure notification from the receiver indicating a failure to decode the message encoded using the initial encoding scheme; and
transmitting the message encoded using the alternative encoding scheme to the receiver;
wherein failure notification is configured to identify the alternative encoding scheme.

2. The method according to claim 1, wherein a header of the message encoded using the initial encoding scheme comprises an indication of the initial encoding scheme.

3. The method according to claim 1, wherein the message encoded using the alternative encoding scheme comprises a header encoded using an encoding scheme common to a sender and the receiver.

4. The method according to claim 1, comprising transmitting the message encoded by successive alternative encoding schemes to the receiver until the receiver successfully decodes the message.

5. The method according to claim 1,
wherein the failure notification is configured to indicate at least one preferred encoding scheme; and
wherein encoding the message using the alternative encoding scheme comprises determining the at least one preferred encoding scheme from the failure notification and encoding the message using the at least one preferred encoding scheme.

6. The method according to claim 1, comprising defining a common encoding scheme that is common to a sender and the receiver.

7. The method according to claim 6, comprising decoding the common encoding scheme from the failure notification.

8. The method according to claim 6, comprising encoding a header of the message using the common encoding scheme.

9. The method according to claim 1, wherein the failure notification comprises a description of the failure, a list of encoding schemes supported by the receiver, or a combination thereof.

10. A system, comprising:
a memory device configured to store instructions; and
a processing device configured to execute the instructions stored in the memory device to:
encode a message from an application using an initial encoding scheme;
transmit the message encoded using the initial encoding scheme to at least one receiver computer;
receive a failure notification from the at least one receiver computer indicating a failure of the at least one receiver computer to decode the message encoded using the initial encoding scheme;

encode the message using an alternative encoding scheme without reference to the application; and transmit the message encoded using the alternative encoding scheme to the at least one receiver computer.

11. The system according to claim 10, wherein the failure notification is configured to indicative that the initial encoding scheme is not implemented in the at least one receiver computer.

12. The system according to claim 10, wherein the failure notification identifies the alternative encoding scheme.

13. The system according to claim 10, wherein the failure notification is configured to identify at least one encoding schemes implemented on the at least one receiver computer.

14. The system according to claim 10, wherein the failure notification comprises a description of the failure, a list of encoding schemes supported by the receiver, or a combination thereof.

15. A non-transitory computer-readable medium comprising computer-executable instructions stored thereon that, when executed by a processing device, cause the processing device to:
receive a message from an application;
encode the message using an initial encoding scheme;
transmit the message encoded using the initial encoding scheme to a receiver;
receive a failure notification from the receiver in response to the message encoded using the initial encoding scheme;
re-encode the message using an encoding scheme indicated in the failure notification without sending the failure notification to the application; and
retransmit the message to the receiver.

16. The non-transitory computer-readable medium of claim 15, wherein the failure notification comprises a description of the failure, a list of encoding schemes supported by the receiver, or a combination thereof.

* * * * *

UNITED STATES PATENT AND TRADEMARK OFFICE
CERTIFICATE OF CORRECTION

PATENT NO. : 8,407,557 B2  Page 1 of 1
APPLICATION NO. : 12/629939
DATED : March 26, 2013
INVENTOR(S) : Peterson et al.

It is certified that error appears in the above-identified patent and that said Letters Patent is hereby corrected as shown below:

On the Title Page, Item (75), under "Inventors", in Column 1, Line 1, delete "W" and insert -- W. --, therefor.

In the Drawings:

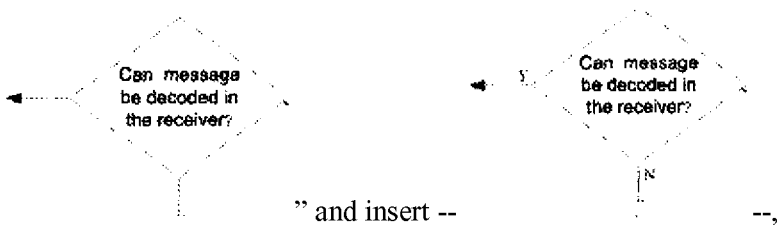

Figure 2:
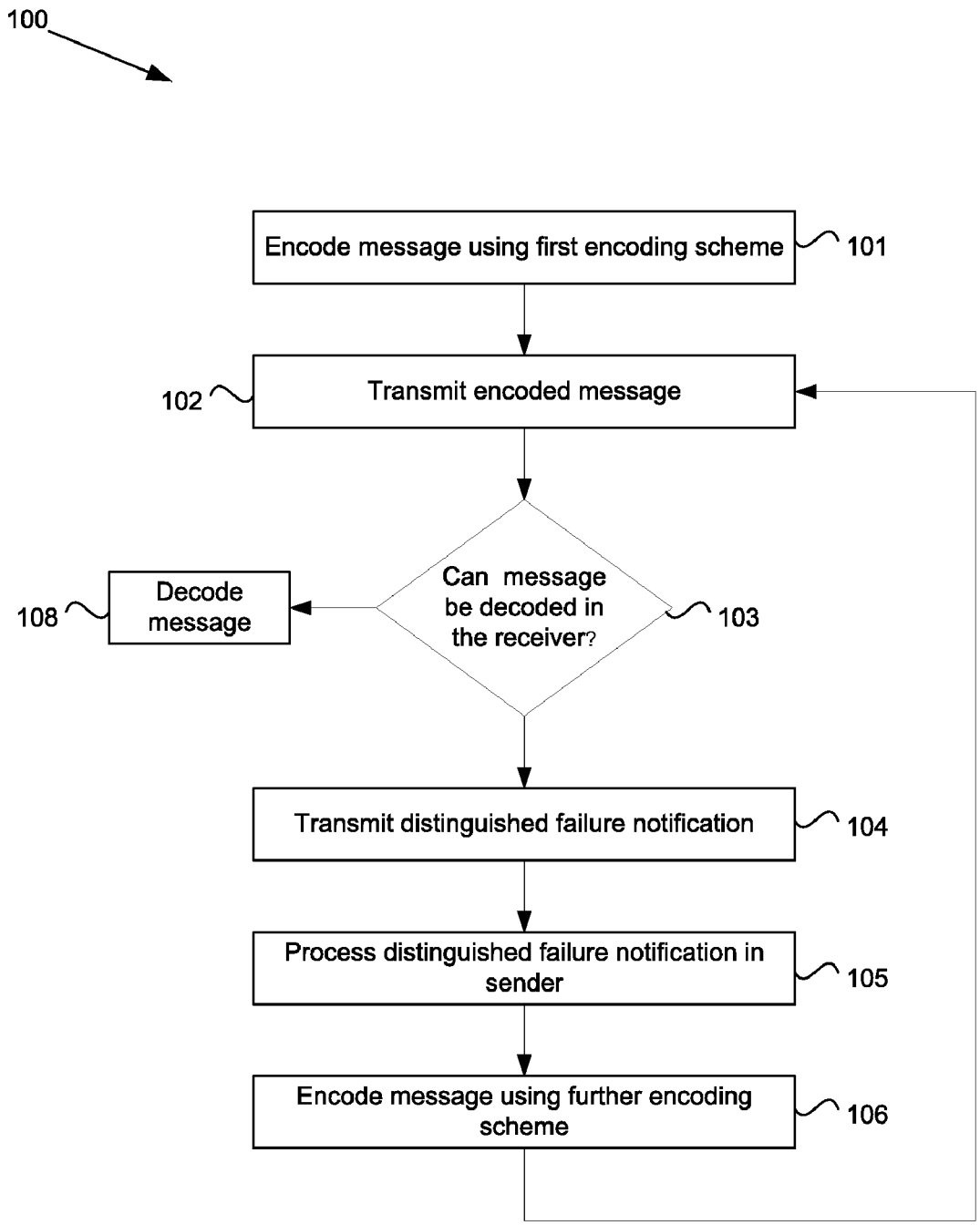
FIG. 2 illustrates a flowchart of a communications method.

In Fig. 2, Sheet 2 of 4, delete " " and insert -- --, therefor.

In the Specifications:

In Column 3, Line 52, delete "receiver 22" and insert -- receiver computer 22 --, therefor.

In Column 3, Line 57, delete "receiver computer" and insert -- receiver computer 22 --, therefor.

In Column 5, Line 48, delete "receiver processor" and insert -- receiver processor 71 --, therefor.

In the Claims:

In Column 6, Line 18, in Claim 1, delete "origination" and insert -- originating --, therefor.

In Column 7, Line 7, in Claim 11, delete "indicative" and insert -- indicate --, therefor.

In Column 7, Line 15, in Claim 13, delete "schemes" and insert -- scheme --, therefor.

Signed and Sealed this
Ninth Day of July, 2013

Teresa Stanek Rea
*Acting Director of the United States Patent and Trademark Office*